Oct. 31, 1933.  L. BENOIT  1,932,720
APPARATUS FOR PROCESSING OF EGGS AND THE LIKE
Filed Dec. 29, 1928   4 Sheets-Sheet 1
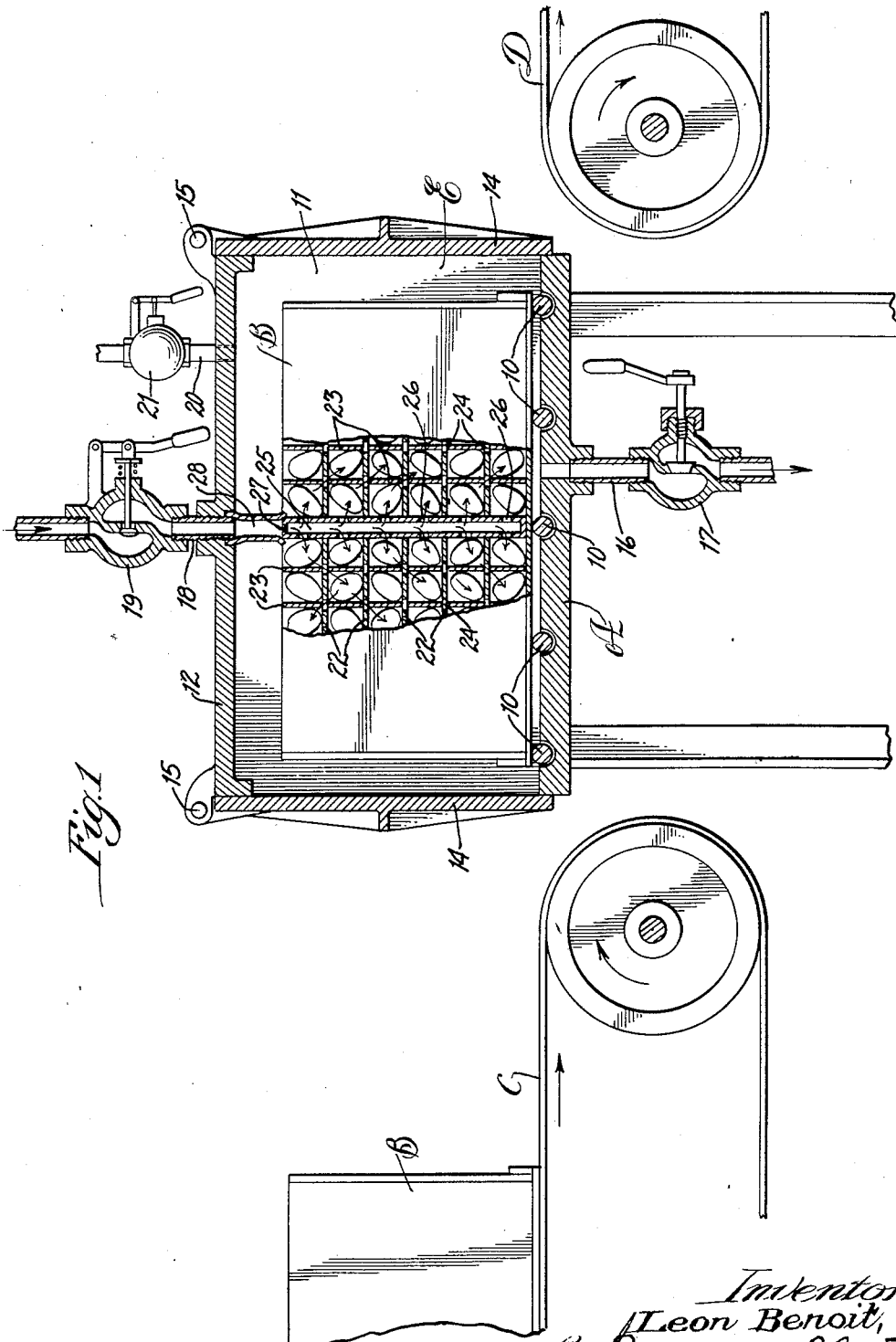

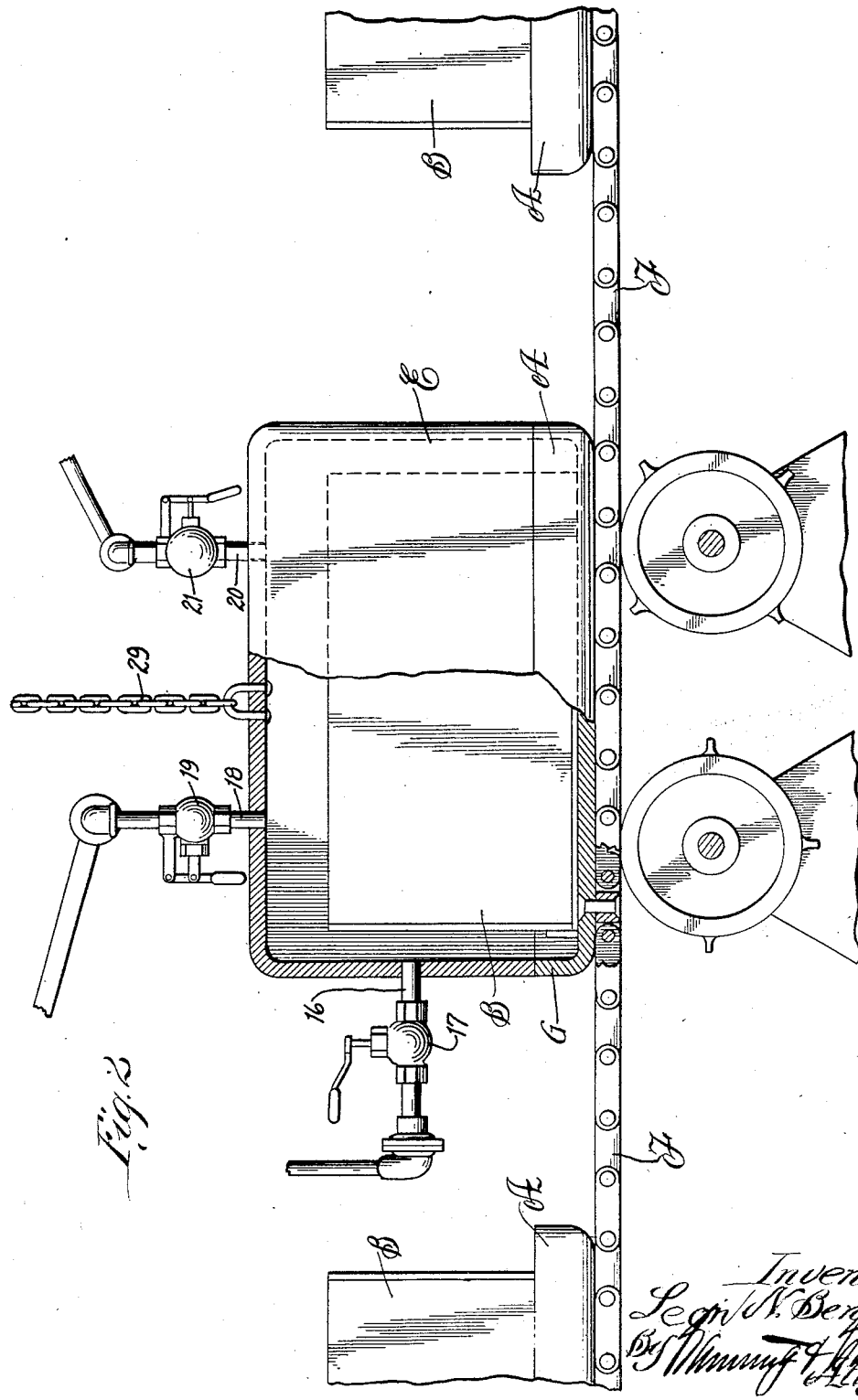

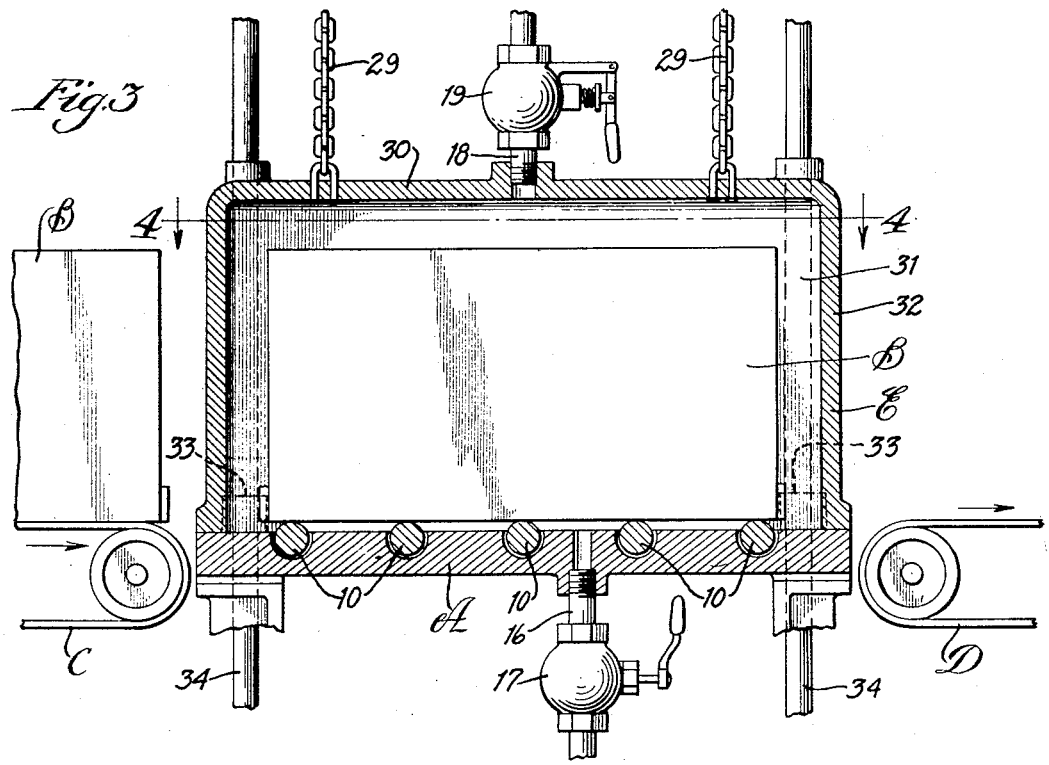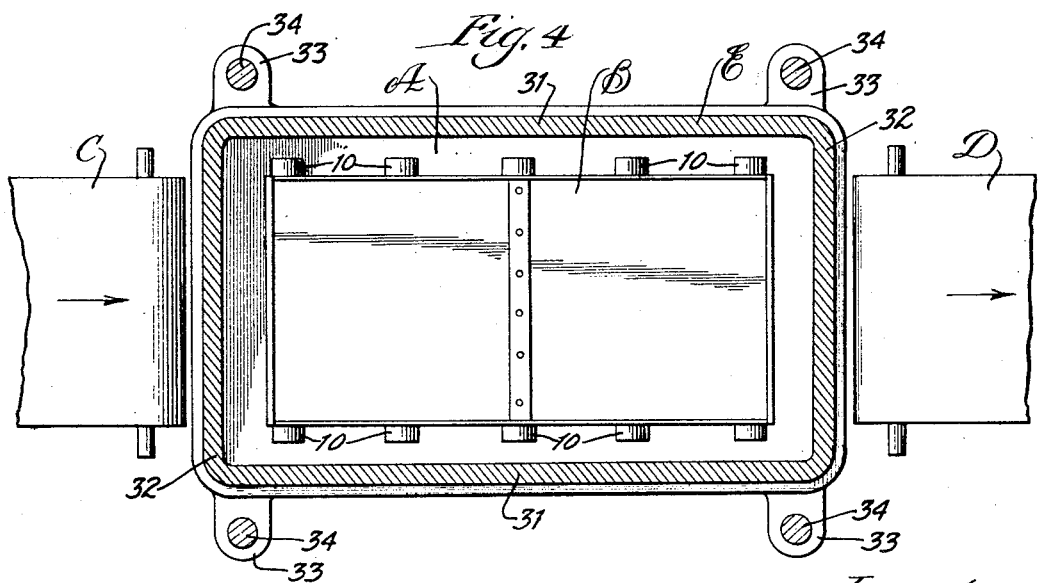

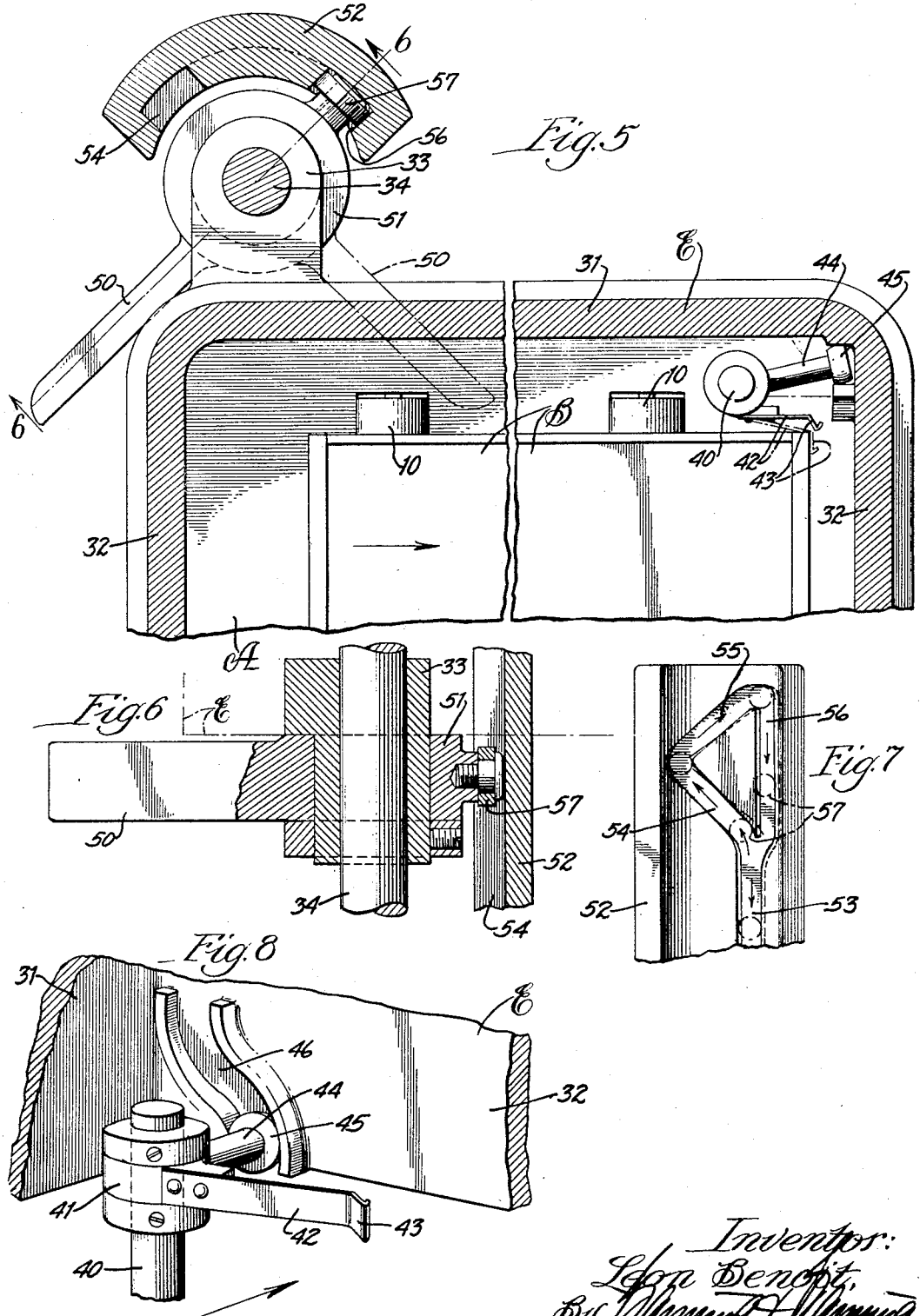

Patented Oct. 31, 1933

1,932,720

UNITED STATES PATENT OFFICE 1,932,720

APPARATUS FOR PROCESSING OF EGGS AND THE LIKE

Leon Benoit, Chicago, Ill.

Application December 29, 1928
Serial No. 329,218

7 Claims. (Cl. 99—2)

This invention is directed to certain improvements by which the processing of eggs and like commodities may be performed in a more expeditious and satisfactory manner. By the use of the apparatus and method herein disclosed, the commodities are treated in a batch while packed in a case in which they may be stored or shipped without further handling.

A suggestive embodiment of this invention is illustrated in the accompanying drawings in the manner following—

Figure 1 is a vertical section through the treating chamber in which appears a case filled with eggs ready to be processed;

Fig. 2 is a similar view of a chamber together with a modified form of associated conveyor;

Fig. 3 is a vertical longitudinal section through the treating chamber;

Fig. 4 is a horizontal section therethrough, taken on line 4—4 of Fig. 3;

Fig. 5 is a horizontal section through the upper portion of the treating chamber, showing the relation thereto of certain associated mechanism;

Fig. 6 is a detail in section on line 6—6 of Fig. 5;

Fig. 7 is a detail in elevation of the cam for controlling the action of the case ejector; and Fig. 8 is a detail in perspective showing the stop mechanism for the case.

Referring to Figure 1, I have shown a bed A equipped with rollers 10 for slidingly supporting a case B containing eggs or other commodities to be treated. A conveyor C is arranged adjacent one end of the bed for delivering thereto a succession of cases, and a conveyor D is provided at the opposite bed end to take the cases therefrom in succession for delivery to a desired point.

A chamber for treating the commodities in the case is provided in conjunction with the bed. As shown, this comprises a hood E having opposite side walls 11, a top 12 and end doors 14 which may be hinged at 15 or otherwise connected to move to open and closed positions. When closed, as shown in Fig. 1, the chamber is substantially air-tight.

From the interior of the chamber a pipe connection 16 in which is a controlling valve 17 leads to a source of minus pressure. A second pipe connection 18 having a valve control 19 also leads from the chamber to a source of steam supply. If desired, a third connection 20 having a valve control 21 may also extend from the chamber to a cooling source. By the manipulation of the several valves which preferably are self-closing after a predetermined open period, it is possible to produce in the chamber conditions of suction, vapor, and coolness.

The case B containing the eggs or other commodities is provided with individual cells therefor, the same consisting of a plurality of superposed flats 22 with intervening filler walls 23 arranged in intersecting relation. The flats and fillers are preferably formed of sheet metal or other material which will withstand the effect of steam and moisture, and provision is made for intercommunication between the cells by means of openings 24 in the flats and also, if desired, by other openings between the fillers (not shown). Possible courses of currents traversing the cells are indicated by the arrows. In addition, I provide centrally in the case a transverse vertical partition 25 which is hollow, there being formed through the walls of this partition openings 26 opposite the several rows of eggs between the flats. The upper end of this hollow partition may further be provided with a series of inlet openings 27 (see Fig. 1) which stand opposite a manifold 28 in connection with the steam pipe 18. By this arrangement, when steam or vapor is admitted through the valve 19, it will be conducted through the hollow partition in the center of the case for distribution throughout all the cells therewithin.

Referring now to Fig. 2, I have shown a modified apparatus which employs a single conveyor F which desirably moves intermittently. Upon the conveyor is mounted at intervals a plurality of beds A having, if desired, upturned marginal walls, each bed being adapted to receive thereon a case B containing eggs or other commodities. Cooperating with the bed is a vertically movable hood E adapted to rest on the base when the latter has advanced to a given position. Vacuum and steam connections 16 and 18, respectively, and also a cold air connection 20, if desired, are extended from the hood, as is also a lifting medium 29 with which may be associated any suitable hoist. The construction just described differs from that of Figure 1 simply in that use is made of a single conveyor carrying a plurality of beds which are adapted to cooperate, one at a time, with the hood forming the treating chamber.

A further modification of the apparatus hereinbefore described is suggested in Figs. 3 and 4. In this construction, I use a bed A with rollers 10, adapted to slidingly support a case B which may be brought to operative position on a conveyor C, a second conveyor D being utilized for the subsequent removal of the case. A vacuum connection 16 having a control valve 17 is also extended from the bed. The upper portion of the treating chamber is in the form of a hood E separable from the bed by a vertical movement, and hence requiring no end doors, as in the construction first described. As shown in Figs. 3 and 4, the hood E is provided with a top wall 30 to which are joined side and end walls 31 and 32, respectively, the lower edges of which are adapted to contact with the bed to effect a seal therewith. Extending laterally from the hood are apertured lugs 33 which slide on guide rods 34 so as to confine the movements of the hood to a vertical straight line. A steam connection 18 having a valve control 19 leads into the hood, and, if desired, a cold air connection (not shown) may also be used, the same as is shown in Fig. 1. The pipe connections to the hood, which are required to raise and lower with the hood, are either flexible or jointed. To assist in elevating the hood lifting chains 29 are employed in connection with any suitable hoisting mechanism, either hand or power operated.

Various accessory features may be incorporated with the constructions heretofore described. In Figs. 5 to 8 inclusive, I have suggested a stop means for arresting travel of the case at a predetermined point in the treating chamber, also a means for ejecting the case from the table after the treating operation has been performed, the action of the stop and ejector being governed entirely by the hood movements.

The stop which is shown in Figs. 5 and 8 comprises a post 40 which upstands from the bed A in one corner which is finally occupied by the entering end of the case B. Mounted for rotation at the upper post end near the top of the hood E is a hub 41 carrying a spring arm 42 having its end 43 laterally bent to lap the end of the case when the same has reached its final position in the treating chamber. The post 40 is disposed to one side of the case, and when the spring arm 42 is swung around to the full line position shown in Fig. 5, the case is free to move past the same. The swinging movements of this spring arm are controlled by a second arm 44 which is extended from the hub 41 toward the proximate end wall of the hood E, a roller 45 being carried at the end of this arm to engage with a cam groove 46 provided on the adjacent hood end.

The ejector by which the case is started on its movement from the hood when the latter is raised, may consist of an arm 50 extended radially from a hub 51 which is journaled for rotation on one of the guide rods 34. This hub is connected with one of the hood lugs 33 so as to raise and lower therewith. Adjacent the hub is an arcuate-shaped cam member 52 having therein a two-way groove 53 which extends vertically thereof. Near its upper end this groove branches into the form of a one-way triangle having an oblique leg 54, a second oblique leg 55, and a third leg 56 which is vertical and slightly offset in relation to the two-way groove 53. Disposed within the groove is a roller 57 which is carried by the hub so as to oscillate the same in accordance with the contour of the cam. The direction of travel of the roller through the upper end of the groove is indicated by the arrows in Fig. 7.

The stop and ejector means shown in Figs. 5 to 8 are caused to operate in a timed relation by vertical movements of the hood E. With the hood in its topmost position ready to receive thereunder a case B on the bed A, the stop arm 42 is swung out to the interfering position shown in Fig. 8, so as to arrest travel of the incoming case. The ejector arm 50 is at the same time swung back to the full line position of Fig. 5, inasmuch as its roller 57 is at the extreme top of the cam triangle shown in Fig. 7. The lowering of the hood produces only a slight change in the position of these parts—merely a retraction of the stop arm to the full line position of Fig. 5. On the up movement of the hood, nothing happens until its lower edge about clears the case top at which moment the ejector roller 57 enters the leg 54 of the cam triangle. The ejector is now set in motion to swing in under the hood and push the case on toward the delivery conveyor for further transportation. During this movement the hood is also completing its up travel so that the stop cam is eventually swung out, but because of its resilient character it will merely scrape along the side of the case which is being ejected. When the case has cleared the stop arm, the latter will spring out to a position for arresting movement of the succeeding case. The ejector arm, it will be noted, is brought back to its initial position represented by full lines in Fig. 5 by the time the hood has arrived at its topmost position, so as to be out of the way when the succeeding case is brought to treating position.

According to this invention, the treatment accorded to the eggs or other commodities in the case will require first a reduction in the pressure within the hood. This is brought about by the opening of a valve leading to the source of suction, followed by the admission through the steam connection of a processing agent in vapor form for permeation through the cellular structure of the case. To accelerate condensation within the cells, it may be found desirable to admit refrigerated air, although this expedient is entirely optional. The effect of this treatment is first to empty the pores of the eggs or other articles in the presence of a partial vacuum, then to fill the pores with a treating agent which is conveyed in the form of vapor; and finally, to condense such agent in the form of a film or seal upon the exterior of the eggs or other articles. These several operations—vacuum, vapor and condensation—may follow one another quickly, requiring in all but a few moments. After condensation has taken place, the hood is lifted, the treated case is removed, and a fresh case brought to treating position.

The advantages of my invention reside largely in the expediency with which the processing may be performed. The eggs or other commodities are given a batch treatment in a case which is suitable for storage and shipping, so that but one filling operation at any time is required. No unpacking, individual handling, or repacking is necessary, as is usual with processing methods now employed. The apparatus herein described is suitable for carrying out the herein disclosed process, but manifestly may be modified, or added to, or changed in various particulars, as may be found desirable.

I claim:

1. An egg processing apparatus in which is comprised a chamber formed by a bed and hood relatively movable to open or close the chamber, means for arresting movement of an egg container which is conveyed into the chamber for the treatment of eggs therein, and means operable by a movement for opening the chamber for ejecting the egg container therefrom.

2. A processing apparatus comprising a bed adapted to receive a container of articles to be treated, a hood adapted to descend over the container and contact with the bed to constitute a substantially air-tight chamber, means operable by the hood for holding the container relative thereto and for ejecting the same, and valved conduits for creating a partial vacuum in the chamber, and supplying vaporous treating agent thereto.

3. A processing apparatus in which is comprised a treating chamber having means for opening and closing the same, an article receiving and supporting bed forming a part of said chamber, means for delivering articles upon said bed, a yieldable stop swingably mounted on said bed, and means operable by said first mentioned means to move said stop into and out of the path of articles delivered upon the bed.

4. A processing apparatus in which is comprised a treating chamber having means for opening and closing the same, an article receiving and supporting bed forming a part of said chamber, means for delivering articles upon said bed, a yieldable stop swingably mounted adjacent one end of said chamber, an article ejector swingably mounted adjacent the opposite end of said chamber, and cam means operable by said first mentioned means and cooperating with said stop and said ejector for alternately stopping and removing articles delivered to said chamber.

5. A processing apparatus adapted to successively receive articles to be treated and to eject the same, comprising a bed having oppositely disposed receiving and delivery end portions, closure means movable relative to said end portions and cooperating with said bed to provide a treating chamber therebetween, means connecting said closure means and bed, and stop and ejecting means operable by relative to said bed to control the receiving and delivery movements of an article upon the bed.

6. A processing apparatus in which is comprised a treating chamber having an article receiving and supporting bed, closure means movable relative to said bed for opening and closing said chamber, means for intermittently delivering articles upon said bed, a movable stop mounted upon said bed, and interconnecting means between said stop, and closure means for moving said stop into and out of the path of articles delivered upon the bed.

7. A processing apparatus in which is comprised a treating chamber having an article receiving and supporting bed, closure means movable relative to said bed for opening and closing said chamber, means for intermittently delivering articles upon said bed, a stop mounted upon said bed and movable relative thereto to arrest movement of articles delivered upon the bed and for releasing the same, article ejecting means also mounted for movement relative to said bed, and means carried by said closure means and operatively connected to said stop and ejecting means.

LEON BENOIT.